United States Patent
Fabries

(10) Patent No.: US 6,974,245 B2
(45) Date of Patent: Dec. 13, 2005

(54) DEVICE FOR MIXING A LIQUID FERTILIZER WITH A FLOW OF WATER, FOR USE BY INDIVIDUALS

(75) Inventor: Jean-Michel Fabries, Lavaur (FR)

(73) Assignee: Fabries Amiflor S.A., Lavaur Cedex (FR)

( * ) Notice: Subject to any disclaimer, the term of this patent is extended or adjusted under 35 U.S.C. 154(b) by 95 days.

(21) Appl. No.: 10/352,995

(22) Filed: Jan. 29, 2003

(65) Prior Publication Data

US 2004/0052155 A1 Mar. 18, 2004

(51) Int. Cl.⁷ .................................................. B01F 5/02
(52) U.S. Cl. ............................ 366/160.1; 366/163.2; 366/182.4; 239/318; 137/893
(58) Field of Search .......................... 366/160.1, 163.2, 366/182.4; 239/310, 318; 137/892–894, 888, 896, 897

(56) References Cited

U.S. PATENT DOCUMENTS

| | | | | |
|---|---|---|---|---|
| 1,036,871 A | * | 8/1912 | Matheson | 137/599.14 |
| 1,920,721 A | * | 8/1933 | Tirrell | 239/311 |
| 2,039,275 A | * | 4/1936 | McGrae | 137/895 |
| 2,246,827 A | * | 6/1941 | Wixom | 137/893 |
| 2,785,012 A | * | 3/1957 | Frewin | 239/310 |
| 2,788,244 A | * | 4/1957 | Gilmour | 239/73 |
| 3,112,884 A | * | 12/1963 | Gilmour | 239/318 |
| 3,188,055 A | * | 6/1965 | Lutjens et al. | 366/163.2 |
| 3,191,869 A | | 6/1965 | Gilmour | |
| 4,186,772 A | | 2/1980 | Handleman | |
| 4,475,689 A | | 10/1984 | Hauger et al. | |
| 4,635,848 A | | 1/1987 | Little | |

FOREIGN PATENT DOCUMENTS

| | | |
|---|---|---|
| GB | 431706 | 7/1935 |
| JP | 56-161825 | * 12/1981 |

* cited by examiner

*Primary Examiner*—David Sorkin

(57) ABSTRACT

The mixing device for liquid fertilizer with a flow of irrigation water, comprises a mixing head (1) provided with an internal mixing chamber (2) into which opens an internal water supply channel (3), adapted to be connected to a source (4) for the distribution of water under pressure, an internal liquid fertilizer supply channel (5*a*) connected by a supply circuit (5) to a remote reservoir (7), and an internal channel (8) for distribution of water with liquid fertilizer added, can be connected to a distribution element (9). The chamber (2) is arranged as a Venturi device such that the flow of water through the chamber (2), from the water supply channel (3) toward the distribution channel (8), causes an effect of sucking liquid fertilizer into the chamber (2) to mix it in this latter with the flow of water.

15 Claims, 1 Drawing Sheet

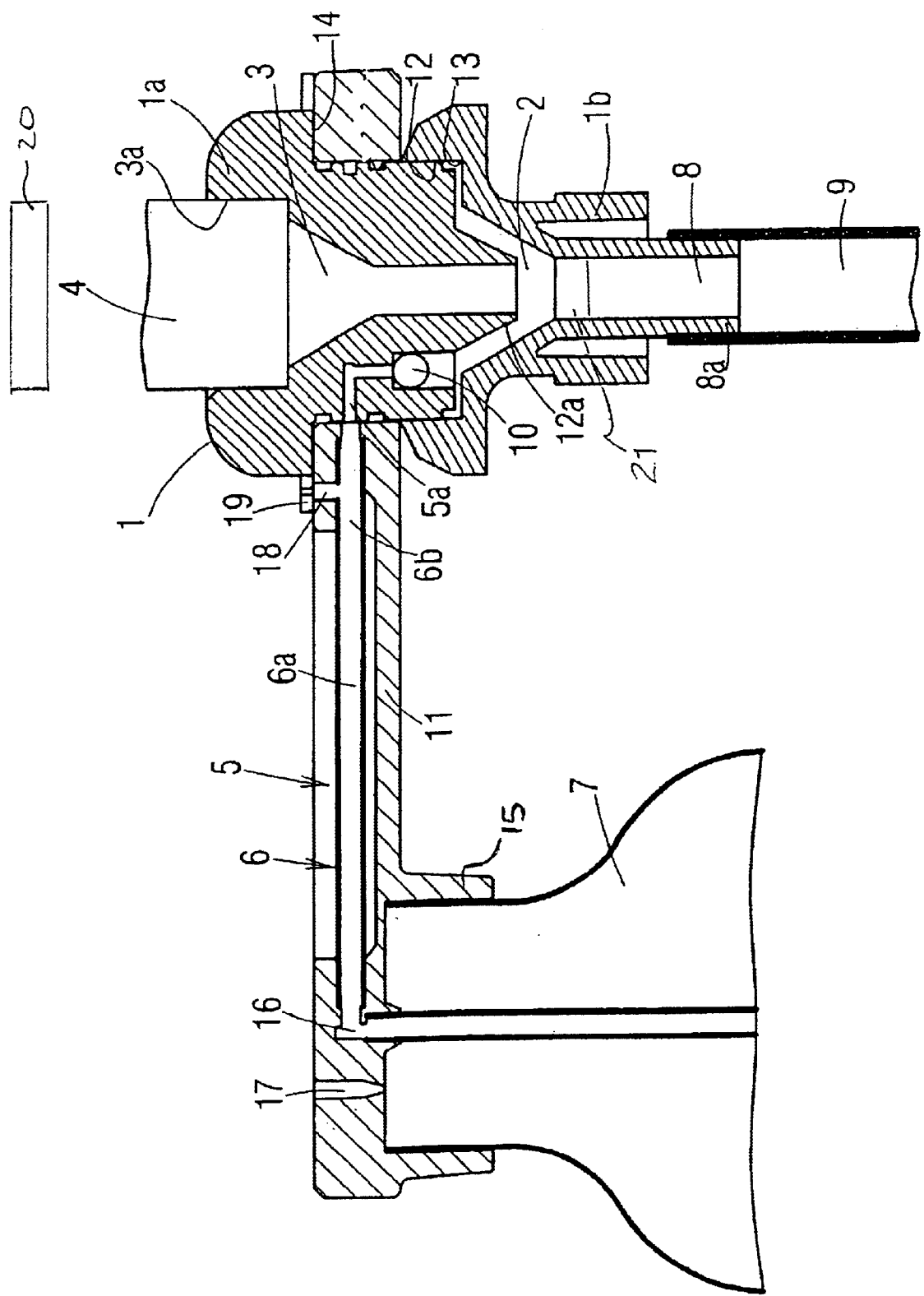

DEVICE FOR MIXING A LIQUID FERTILIZER WITH A FLOW OF WATER, FOR USE BY INDIVIDUALS

BACKGROUND OF THE INVENTION

The present invention relates to a device for the introduction and mixing of a liquid fertilizer in a flow of water for irrigation and fertilizing the roots and foliage of plants. Principally, this device is for use by individuals. For fertilizing with an aqueous solution containing liquid fertilizer, it is known to introduce the required quantity of liquid fertilizer into the required quantity of water and to agitate it for mixing. In practice, the necessary quantity of water is introduced into a watering can, into a bucket or into a spray apparatus, then the user, with the help of a metering cap on the liquid fertilizer receptacle, which is usually present in the form of a bottle made of synthetic material, introduces the necessary quantity of liquid fertilizer. Such an operation gives rise to numerous problems. On the one hand, it requires manipulation of a relatively toxic liquid and does not avoid the risk of contact of this liquid with the skin, the mucous membranes or the eyes in case of splashing, which can be dangerous and on the other hand it does not avoid risk of error in the dosage which can lead to a lack of fertilizer or else to an excess which could destroy the plants.

SUMMARY OF THE INVENTION

The present invention has for its object to overcome the mentioned drawback, by providing a mixing device which ensures the automatic incorporation of the liquid fertilizer into the water flow and which ensures a uniform distribution of it.

To this end, the mixing device according to the present invention, for a liquid fertilizer with a flow of water, is characterized essentially in that it comprises a mixing head provided with an internal mixing chamber into which open an internal water supply channel adapted to be connected to a source of distribution of water under pressure, an internal liquid fertilizer supply channel connected by a supply circuit to a sealed remote reservoir, and an internal channel for distribution of water with added liquid fertilizer, that can be connected to an element for the distribution of water, and said chamber being arranged as a Venturi such that the flow of water through the chamber, from the water supply channel to the distribution channel, causes an effect of sucking the liquid fertilizer into the mixing chamber for mixing it with the water flow.

There is thus ensured, without any manipulation at all, the intimate mixing of the liquid fertilizer with water in the course of distribution and not, as before, with irrigating water to be distributed.

The suction effect produced by the Venturi arises from the flow of water through the mixing head, such that when the flow is interrupted, the suction effect disappears by itself, which stops the flow of liquid fertilizer toward the mixing head. To avoid any parasitic flow of liquid fertilizer by a siphon effect after stopping the flow of water, the level of liquid fertilizer in the reservoir is located at a lower level than the mixing chamber.

So that the suction of liquid fertilizer toward the mixing chamber will not be counterbalanced by too greater a vacuum in the reservoir, the mixing device, according to another aspect of the invention, is provided with means to connect the liquid fertilizer reservoir to the ambient air, said means being constituted by a channel in communication with the atmosphere and opening into the upper portion of the reservoir, above the liquid level, to maintain said upper portion at atmospheric pressure.

It is possible to omit the communication means with the ambient air by using a reservoir constituted by a flexible pouch, deformable under the influence of atmospheric pressure. This pouch, for its protection against the preparation, could be disposed in a protective shell that is not sealed.

The channel constituting the means for connection with ambient air could be provided with an adjustable constriction. This constriction permit adjusting the flow rate of air entering the reservoir during suction of the liquid fertilizer and as a result the flow rate of the sucked up liquid fertilizer. There is thus adjusted in a particularly simple manner, the concentration of liquid fertilizer in the irrigating water.

According to another embodiment, to adjust the concentration of liquid fertilizer in the irrigating water, there is provided, in the liquid fertilizer supply circuit, an air intake means adjustable as to communication, on the one hand, with the atmosphere, and on the other hand, with said circuit, to permit introduction into this latter of a flow of dilution air whose flow rate is adjustable by said means. By adjustment of the value of the flow rate, it becomes possible to adjust the value of the flow rate of fertilizer toward the mixing chamber and consequently the proportion of liquid fertilizer in the irrigating water.

Preferably, the adjustable air intake means comprises an air intake channel, internal to the device, communicating on the one hand with the atmosphere and on the other hand with said circuit to permit the introduction of a flow of dilution air into the latter, whose flow rate is adjustable by an adjustment mechanism coacting with the opening of the internal channel to the atmosphere.

According to another aspect of the invention, this adjusting mechanism is constituted by a plate movable against and facing the external opening of the channel to the atmosphere, this plate comprising calibrated through holes of different diameters, arranged from largest to smallest, and each adapted to be brought by movement of the plate into registry with the external opening of the channel. All these openings, except the largest, will have a diameter smaller than that of the opening of the air intake channel to the atmosphere. As can be seen, the size of the opening determines the value of the flow rate of air into the channel and as a result the quantity of dilution of the air in the liquid fertilizer flow and hence the concentration of liquid fertilizer in the irrigation water.

The opening of the air intake channel can be totally closed by the plate, in which case the fertilizer flow rate is a maximum and the concentration of liquid fertilizer in the irrigating water is also a maximum.

It is necessary to be able to distribute the irrigation water without at the same time mixing this latter with liquid fertilizer, and this without having to remove the fertilizer reservoir or empty it of its contents. To this end, the invention, according to another of its aspects, provides a stop valve disposed in the liquid fertilizer supply circuit, said valve being adapted to occupy a closed position of said circuit and an open position of said circuit. This arrangement can be used in combination with the adjustable air intake means, but preferably, according to another embodiment, the diameter of the internal air inlet channel is such that when its opening is totally exposed, the suction of fertilizer in the reservoir is zero or very small, and is not sufficient to bring the liquid fertilizer to the mixing chamber of the device. One of the positions of the movable plate totally exposes the opening by disposing in registry with the opening the hole of greatest diameter, this latter having a diameter equal to or greater than that of said opening. According to this embodiment, the use of a stop valve is avoided.

The water distribution element, with if desired added liquid fertilizer, can be a watering hose comprising at one end a distribution nozzle with controlled closure, this distribution nozzle being adapted to be that of a watering wand on the pipe. To avoid the irrigation water flowing back into the liquid fertilizer reservoir when the nozzle is closed or when the loss of pressure in the distribution element is too great, the liquid fertilizer supply circuit is provided with a non-return valve preventing any reflow of liquid toward the sealed reservoir.

The device according to the invention can be disposed at the outlet of a watering tap or a hose but also between a source of distribution of water under pressure and a distribution element of the drop-wise type. To this end, the device is provided with a sequencer between the source of distribution of water and the water supply channel and a pressure expanded at the outlet of the water distribution channel.

BRIEF DESCRIPTION OF THE DRAWINGS

Other advantages, objects and characteristics of the invention will become apparent from a reading of the description of a preferred embodiment, given by way of non-limiting example, with reference to the accompanying drawings, in which:

the accompanying drawing, in which the single FIGURE is a longitudinal cross-sectional view of the device according to the invention.

As shown, the device according to the invention for the mixture of a liquid fertilizer with a flow of irrigation water, comprises a mixing head 1 provided with an internal mixing chamber 2 into which opens an internal water supply channel 3, adapted to be connected to a source 4 of distribution of water under pressure, a supply circuit 5 for liquid fertilizer, connected to a remote liquid fertilizer reservoir 7, and an internal distribution channel 8 for water with added liquid fertilizer, can be connected to a distribution element 9, said mixing chamber 2 being arranged as a Venturi device such that the flow of water through the chamber, from the water supply channel 3 toward the distribution channel 8, causes a suction effect on the liquid fertilizer in the chamber 2 for mixing this latter with the flow of water.

The internal water supply chamber 3 preferably will have a screw-threaded mouth 3a for connection to the source of distribution of water under pressure 4, this distribution source being adapted to be a domestic tap for the distribution of water under pressure. The screw threading of the connection mouth 3a will receive by screwing the screw-threaded fitting of the distribution tap 4. Preferably, the screw-threaded mouth 3a, the water supply channel 3, the mixing chamber 2, and the distribution channel 8, are coaxial.

Again according to the preferred embodiment, the terminal portion of the internal channel 8 for distribution of the mixture of water and fertilizer is provided coaxially in a cylindrical screw-threaded fitting 8a for connection to the distribution element 9, said channel opening into the flat end surface of said fitting 8a.

The distribution element 9 could be a hose comprising at its proximal end a screw-threaded connection, known per se, to be connected by screwing to the cylindrical screw-threaded fitting 8a of the mixing head. This hose 9 could comprise at its distal end a calibrated distribution nozzle with control closing and if desired an adjustable degree of opening, this distribution nozzle, known per se, being adapted to be a watering lance on the hose.

The supply circuit 5 of the mixing head, for liquid fertilizer, comprises a conduit 6 communicating with the internal volume of the reservoir and an internal channel 5a provided in the mixing head 2, said channel 5a being in communication on the one hand with the conduit 6 and on the other hand with the mixing chamber 2, this channel opening into said chamber. In the case in which the reservoir used is of the rigid type, the conduit 6 will extend down into the bottom of the reservoir and below the maximum liquid level and its distal end will be located adjacent the bottom of this latter at a position corresponding substantially to the low level of liquid fertilizer in the reservoir.

To avoid any backward flow toward the reservoir 7, because of closure of the nozzle of the hose 9 or by reason of too great loss of pressure, the supply circuit 5 for fertilizer is provided with a non-return valve 10. This non-return valve can be disposed in the internal channel 5a for supplying liquid channel or else in the conduit 6. This valve 10 can also be disposed between said channel and said conduit.

Preferably, the mixing head 1 is secured to a support 11 remotely holding the liquid fertilizer reservoir 7. Several reservoirs could also be provided.

Preferably, the support 11 and the head 1 are secured to each other with the possibility of movement in rotation relative to each other and this preferably along the longitudinal geometric axis of the head 1. There thus remains for the support 11, after connection of the mixing head 2 to the source of water 4 under pressure, a freedom of pivoting and of orientation about the longitudinal axis of the head, so as if desired to be able to disengage the reservoir from an obstacle nearby.

It can also be provided that the head will be connected to the support rigidly.

According to the preferred embodiment, the head 1 is made of two parts, an upper part 1a and a lower part 1b, connected in sealed relation to each other, the internal channels 3, 5a for supply of water and liquid fertilizer being provided in the upper portion whilst the mixing chamber 2 and the internal water distribution channel 8 are provided in the lower portion 1b.

The upper portion 1a of the head, has a cylindrical fitting 12, screw threaded over at least a portion of its length, and the lower portion 1b of the head has a screw-threaded recess 13 in which is engaged screw-threadedly the screw-threaded portion of the cylindrical fitting 12 of the upper portion of the head. The recess is in communication with the mixing chamber 2.

The liquid fertilizer supply channel 5a opens against the flat end surface of the cylindrical fitting 12, laterally of a downward projection 12a, the shape of a truncated cone, on said flat surface. The water supply channel 3 opens into the flat terminal surface of the truncated cone shape. The mixing chamber 2 has a conical shape. The truncated conical projection penetrates the conical shape mentioned above, the mixing chamber thus being delimited by the truncated conical projection 12a and the conical shape.

The upper portion 1a of the head is provided with a cylindrical shoulder 14. Moreover, the support 11 has a through bore in which is engaged with functional play the cylindrical fitting 12 of the upper portion 1a and the thickness of the support 11 about the through bore is slightly less than the interval existing between the shoulder 14 and the upper portion 1a and the flat surface about the recess 13 of the lower portion 1b after total engagement of the screw-threaded fitting 12 into the screw-threaded recess, said shoulder and said flat surface constituting abutments for the axial movement of the support along the cylindrical fitting.

The support 11, at a distance from the head, has a blind bore 15, screw threaded to receive by screwing, in a sealed manner, the screw-threaded neck of the receptacle 7 for liquid fertilizer. This support 11 in line with this blind bore has a first through hole 16 in which is engaged sealingly the supply conduit 6 for liquid fertilizer, said conduit entering the reservoir 7 and a second through bore 17, constituting the communication with ambient air, this hole being adapted to receive an adjustable device for communicating the liquid fertilizer reservoir with the ambient air, said device being constituted preferably by an adjustable constriction. By adjustment of the degree of opening this device, there is adjusted the flow rate of air entering the reservoir ensuring suction of the liquid fertilizer and as a result the flow rate of liquid fertilizer toward the mixing head is adjusted.

The supply conduit 6 for liquid fertilizer could be provided with a stop valve that can occupy a closed position for the conduit and an open position for said conduit. This stop valve could be mounted fixedly on the support 11 and could comprise a valve body with a through bore in which will be engaged the conduit 6, this latter at the level of the bore will at least be constituted by a flexible resiliently deformable material. The valve will be equipped with a movable pinching member in a radial hole opening into the bore, this pinching member being adapted to be brought to bear against the conduit to pinch the latter to close it.

As a modification, to adjust the concentration of liquid fertilizer in the irrigation water, there is provided, on the liquid fertilizer supply circuit 5, an adjustable air intake means, in communication on the one hand with the atmosphere and on the other hand with said circuit, to permit the introduction into the latter of a flow of dilution air whose flow rate is adjustable by said means. By adjustment of the value of the flow rate of air, there is regulated the value of the flow rate of fertilizer to the mixing chamber and consequently the portion of liquid fertilizing in the irrigating water.

The adjustable air intake comprises an air intake channel 18, formed in the support 11, in communication on the one hand with the atmosphere and on the other hand with said circuit 6 to permit in this latter the introduction of a flow of dilution air. The flow rate of the air is adjustable by an adjustment mechanism coacting with the opening to the atmosphere of the air intake channel. The opening to the atmosphere of the air intake channel is formed in the upper surface of the support 11.

Preferably, the conduit 6 is formed by a first section constituted by an external tube 6a and by a second section 6b connected to the former, formed by a hole provided in the support 11, this hole being in communication with the internal channel 5a by means of a rotatable joint formed in part in the support 11 and in part in the upper portion 1a of the head 1. Typically, this rotatable joint is formed by a peripheral throat provided in the upper portion 1a of the head, into which throat opens the internal channel 5a. The opening 6b forming one of the two parts of the conduit, is facing, by its mouth, the through opening of the support 11 facing the peripheral throat. The channel 18 for air intake opens into the hole provided in the support 11.

According to a preferred embodiment, the adjustment mechanism is constituted by a movable plate 18 movable against and facing the external opening of the air intake channel 18 to the atmosphere, this plate 19 comprising through calibrated holes, of different diameters, ranging from the largest to the smallest, and each adapted to be brought by movement of the plate 19 into registry with the external mouth of the channel 18. All these openings except the largest will have a smaller diameter than that of the diameter of the mouth of the air intake channel 18.

As will be seen, the size of the hole determines the value of the flow rate of air in the channel 18 and accordingly the quantity of dilution of the air in the flow of liquid fertilizer and hence the concentration of the liquid fertilizer in the irrigating water.

Preferably, the plate 18 is present in the form of a circular crown disposed about the upper portion 1a of the mixing head and held in contact with the upper surface of the support 11. This plate 19 is movable in rotation about the head 1 and the openings are arranged in a circle.

The mouth of the air intake channel 18 can be totally closed by the plate 19, and in this case the fertilizer flow rate is the maximum and the concentration of liquid fertilizer in the irrigating water is also the maximum.

The diameter of the internal air intake channel 18 is such that when the mouth of the channel is totally open, the suction of fertilizer from the reservoir 7 is zero or very small and is not sufficient to bring the liquid fertilizer to the mixing chamber 2 of the head. One of the position of the movable plate 19 totally opens the mouth of the opening 18 by arranging opposite the mouth for example the largest opening, this latter having a diameter equal to or greater than that of said mouth.

Finally, the device according to the invention in the case of its use with watering of the drop-wise type, will be provided with a sequencer 20 disposed between the source of water distribution and the water supply channel and with a pressure expander 21 disposed at the outlet of the water distribution channel.

It follows that the present invention can have all arrangements and variations within the scope of technical equivalents without thereby departing from the scope of the present patent.

What is claimed is:

1. Mixing device for a liquid fertilizer with a flow of irrigation water, that comprises a mixing head provided with an internal mixing chamber into which opens an internal channel for the supply of water, adapted to be connected to a source of distribution of water under pressure, an internal channel for the supply of liquid fertilizer connected by a supply circuit to a remote reservoir, and an internal channel for distribution of water with added liquid fertilizer that can be connected to a distribution element, said mixing chamber being arranged as a Venturi device such that the flow of water through the mixing chamber, from the water supply channel, toward the distribution channel, causes an effect of sucking the liquid fertilizer into the chamber for mixing the liquid fertilizer with the flow of water, wherein the mixing head is made of two parts, an upper part and a lower part, connected in sealed relation to each other, the internal water supply channel and liquid supply channel being arranged in the upper part whilst the mixing chamber and the internal channel for distribution of water are provided in the lower part, the mixing chamber having a conical shape, wherein the upper part of the head has a cylindrical fitting screw-threaded on at least a long portion and the lower part of the head has a screw-threaded recess in which is engaged by screwing the screw-threaded part of the cylindrical fitting of the upper part of the head, said recess being in communication with the mixing chamber, and said channels for liquid fertilizer supply and water supply open respectively into the flat end surface of the cylindrical fitting and the flat end surface of truncated conical projection projecting downwardly, wherein the upper part of the head in axial prolongation of the cylindrical fitting is provided with a cylindrical shoulder, and wherein a support has a through bore in which is engaged with functional play the cylindrical fitting of the upper part and the thickness of the support about the through bore is less than the interval remaining between the shoulder of the upper part and the flat surface about the recess of the lower part after total engagement of the screw-threaded fitting in the screw-threaded recess, said shoulder and said flat surface about the flat surface constituting abutments to the axial movement of the support along the cylindrical fitting.

2. Mixing device according to claim 1, characterized in that it is provided with a means (17) for connecting the liquid fertilizer reservoir (7) to the ambient air.

3. Mixing device according to claim 2, characterized in that the device for connection to the ambient air is constituted by an adjustable constriction to adjust the concentration of liquid fertilizer in the irrigation water.

4. Mixing device according to claim 1, characterized in that it is provided, in the circuit (5) for supplying liquid fertilizer, with an adjustable air intake means in communication on the one hand with the ambient atmosphere and on the other hand with said circuit (5), to permit the introduction into this latter of a flow of dilution air whose flow rate is adjustable by said means.

5. Mixing device according to claim 4, characterized in that the adjustable air intake means comprises an air intake channel (18), internal to the device, in communication on the one hand with the atmosphere and on the other hand with said circuit (5) to permit in this latter the introduction of the flow of dilution air whose flow rate is adjustable by an adjustment mechanism coacting with the opening of the internal channel to the atmosphere.

6. Mixing device according to claim 5, characterized in that the adjustment mechanism is constituted by a movable plate (19) movable against and facing the external opening of the channel (18) to the atmosphere, this plate (19) comprising calibrated through holes, of different diameters, ranging from the largest to the smallest, and each adapted to be brought, by movement of the plate (19), into registry with the external mouth of the channel (18).

7. Mixing device according to claim 1, characterized by a stop valve disposed in the liquid fertilizer supply circuit (5), said valve being adapted to occupy a position of closing said circuit and a position of opening said circuit.

8. Mixing device according to claim 1, characterized in that the internal channel (3) for water supply has a screw-threaded mouth (3a) for connection to the source (4) of distribution of water under pressure.

9. Mixing device according to claim 1, characterized in that the end portion of the internal channel (8) for distribution of the mixture of water and fertilizer is provided axially in a screw-threaded fitting (8a) for connection to a distribution element (9), said channel (8) opening in the flat end surface of said fitting.

10. Mixing device according to claim 1, characterized in that the liquid fertilizer supply circuit (5) is provided with a non-return valve (10) preventing any backflow of liquid toward the reservoir (7).

11. Mixing device according to claim 1, characterized in that the liquid fertilizer supply circuit (5) comprises a conduit (6) formed by a flexible portion (6a) and by a hole (6b) provided in the support (11).

12. Mixing device according to claim 11, characterized in that the support (11) at a distance from the head (1) has a blind screw-threaded bore (15) to receive by screwing, in a sealed manner, the screw-threaded neck of the receptacle (7) for liquid fertilizer, said support (11) having a first through-hole in which is engaged in a sealed manner the liquid fertilizer supply conduit (6), said conduit entering the reservoir and a second through-hole constituting a communication with the ambient air.

13. Mixing device according to claim 1, characterized by a sequencer disposed between the source of water distribution and the channel for supplying water and by a pressure expander disposed at the outlet of the water distribution channel.

14. Mixing device according to claim 1, characterized in that the head is secured to the support for remotely carrying said reservoir for liquid fertilizer.

15. Mixing device according to claim 14, characterized in that the support and the head are secured to each other with the possibility of relative rotation.

* * * * *

UNITED STATES PATENT AND TRADEMARK OFFICE
CERTIFICATE OF CORRECTION

PATENT NO.     : 6,974,245 B2
DATED          : December 13, 2005
INVENTOR(S)    : Jean-Michel Fabries It is certified that error appears in the above-identified patent and that said Letters Patent is hereby corrected as shown below:

Title page,
Insert Item
-- [30] Foreign Application Priority Data
September 17, 2002     [FR]     France…………………………..0211496 --.

Signed and Sealed this

Seventh Day of February, 2006

JON W. DUDAS
*Director of the United States Patent and Trademark Office*